(12) United States Patent
Ohnstein et al.

(10) Patent No.: US 9,989,730 B2
(45) Date of Patent: Jun. 5, 2018

(54) ALIGNMENT OF AN OPTICAL COMPONENT

(71) Applicant: Honeywell International Inc., Morristown, NJ (US)

(72) Inventors: Thomas Ohnstein, Roseville, MN (US); Bernard S. Fritz, Eagan, MN (US); Daniel Youngner, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 239 days.

(21) Appl. No.: 14/798,941

(22) Filed: Jul. 14, 2015

(65) Prior Publication Data

US 2017/0017059 A1   Jan. 19, 2017

(51) Int. Cl.
 *G02B 7/182* (2006.01)
(52) U.S. Cl.
 CPC ................ *G02B 7/1822* (2013.01)

(58) Field of Classification Search
 CPC ............... G02B 7/1822; G02B 7/198
 See application file for complete search history.

(56) References Cited

U.S. PATENT DOCUMENTS

| 7,166,493 B2* | 1/2007 | Dentry ............... H01L 21/50 257/777 |
| 7,180,078 B2 | 2/2007 | Pau et al. |
| 7,859,350 B1* | 12/2010 | Schwindt ............ H03L 7/099 331/3 |
| 2003/0025227 A1* | 2/2003 | Daniell ........... B29D 11/00278 264/2.5 |

* cited by examiner

*Primary Examiner* — Jennifer D. Carruth
(74) *Attorney, Agent, or Firm* — Brooks, Cameron & Huebsch, PLLC

(57) ABSTRACT

Methods, apparatuses, and systems for alignment of an optical component are described herein. One method includes forming a pit in a substrate, placing an optical component in the pit, and aligning the optical component such that an edge of the optical component is in physical contact with an alignment edge of the pit.

20 Claims, 3 Drawing Sheets

ALIGNMENT OF AN OPTICAL COMPONENT

STATEMENT OF GOVERNMENT RIGHTS

This invention was made with Government support under contract: W911NF-12-1-0605, awarded by the U.S. Army. Accordingly, the Government has certain rights in this invention.

TECHNICAL FIELD

The present disclosure relates to methods, apparatuses, and systems for alignment of an optical component.

BACKGROUND

Integrated optical bench systems (e.g., integrated microstructured silicon optical bench systems) can become increasingly complex as increasing numbers of optical components are included in such systems. These components, such as mirrors, can be made using macromachining techniques or micromachining techniques, the latter approach generally providing comparatively more precise component dimensioning than the former.

Regardless of the manufacturing approach used to make an optical component, the optical component can be formed with edges or surfaces that are not substantially perpendicular to one another. This can result in misalignment of the optical component, which can lead to errors and/or losses in the system.

DETAILED DESCRIPTION

The embodiments of the present disclosure relate to methods, apparatuses, and systems for alignment of an optical component. In order to effectively and/or precisely align an optical component, the embodiments have to address the issues discussed above.

In doing so, there are several different issues which can arise from the use of some previous approaches to optical component alignment technology that can be overcome. One such issue can arise when optical component edges are not perpendicular to each other. This can yield errors and/or losses in an optical system. For example, non-perpendicular optical component edges can result in a misaligned light path.

In the following detailed description, reference is made to the accompanying figures that form a part hereof. The figures show by way of illustration how one or more embodiments of the disclosure may be practiced.

The embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

It should be noted that although many of the figures provided herein provide visual views of example optical bench configurations and example alignments of optical components, the embodiments of the present disclosure can be accomplished by using different configurations, materials, and/or components. Further, as used herein, "a" or "a number of" something can refer to one or more such things. For example, "a number of optical components" can refer to one or more optical components.

Figure 1:
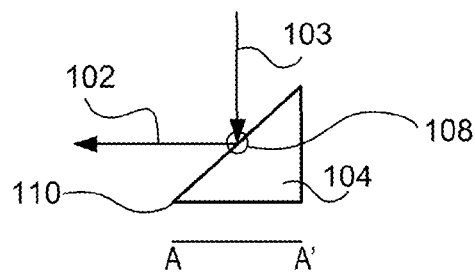
FIG. 1 provides a side-view illustration of an example optical component according to an embodiment of the present disclosure.

FIG. 1 provides a side-view illustration of an example optical component according to an embodiment of the present disclosure. As used herein, an "optical component" is a part of an optical instrument which acts on light passing through the instrument and/or optical component. As an example, light being acted on by an optical component can be focused, filtered, split, diffracted, reflected, etc. Examples of optical components include lenses, prisms, mirrors, filters, beam splitters, diffraction gratings, etc.

As illustrated in FIG. 1, optical component 104 can include a first edge 110 and a second edge (e.g., second edge 211 illustrated in FIG. 2). In some embodiments, optical component 104 can act upon a first light path 103, for example, at point 108, to alter a characteristic of the first light path 103, yielding a second light path 102. As an example, optical component 104 can be a mirror and second light path 102 can be a reflection (e.g., a specular reflection) of first light path 103. In some embodiments, optical component 104 can be a mirror, for example having a reflective surface that is a 45 degree angle with respect to a surface on the mirror that will be used to place the mirror on another surface.

Figure 2A:
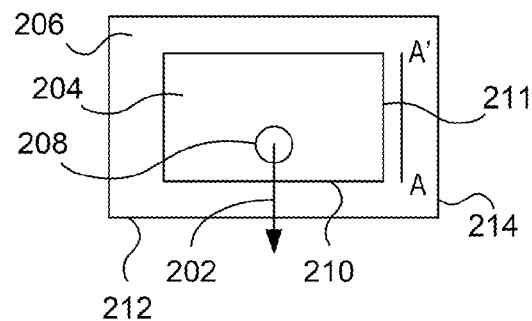
FIG. 2A provides a top-view illustration of an optical component and pit according to an embodiment of the present disclosure.
Figure 2B:
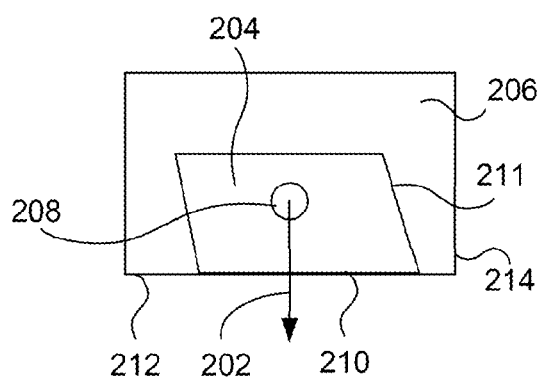
FIG. 2B provides a top-view illustration of an optical component aligned with a first edge of a pit according to an embodiment of the present disclosure.
Figure 2C:
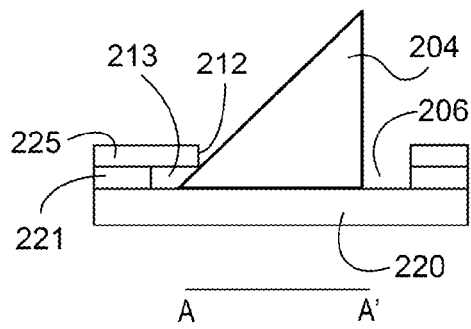
FIG. 2C provides a side-view illustration of an optical component aligned with a first edge of a pit according to an embodiment of the present disclosure.

FIGS. 2A-2C illustrate various examples of an optical component disposed in an etch pit. In some embodiments illustrated in FIGS. 2A-2C, an optical component can be aligned in the pit such that errors and/or losses that can result from misalignment of the optical component can be reduced and/or minimized.

FIG. 2A provides a top-view illustration of an optical component and pit according to an embodiment of the present disclosure. In some embodiments, optical component 204 can be a corner mirror, as described in connection with FIG. 1, herein. In some embodiments, the optical component 204 can have a substantially rectangular shape when viewed from above, as illustrated in FIG. 2A. The pit 206 can have a first edge 212 and a second edge 214. Similarly, the optical component 204 can have a first edge 210 and a second edge 211. The line A-A' shown in FIG. 2A is included to show an orientation of optical component 204 in relation to optical component 104 illustrated in FIG. 1.

In some embodiments, the first edge 212 and/or the second edge 214 of the pit can be an alignment edge. As used herein, an "alignment edge" is an edge of the pit 206 that is formed such that the edge is substantially linear. Advantageously, a substantially linear alignment edge can facilitate alignment of the optical component by providing a surface against which to form the optical component. Accordingly, the first edge and/or the second edge and a first alignment edge are referred to interchangeably herein.

In some embodiments, the pit 206 can be formed in a portion of an optical system (e.g., optical system 300 illustrated in FIG. 3 or optical system 400 illustrated in FIG. 4) and/or can be disposed in an apparatus body. In some embodiments, the pit 206 can be formed using deep reactive ion (DRIE) etching techniques, among other suitable techniques. As an example, pit 206 can be an etch pit, and the terms "pit" and "etch pit" are used interchangeably herein.

The pit 206 can be formed such that the pit 206 is substantially rectangular. As used herein, "substantial" and "substantially" mean that the characteristic need not be absolute, but is close enough to the absolute characteristic so as to achieve the advantages of the characteristic. For example, substantially orthogonal means that the angle formed between two edges is sufficiently close to 90 degrees to achieve the characteristic of the two edges being exactly 90 degrees. As a further example, substantial physical contact means physical contact that does not require every point of two surfaces to be in contact with each other, but enough points of the two surfaces are in physical contact with each other to achieve the characteristic of the two surfaces being in contact with each other.

In some embodiments, the optical component 204 can act upon a first light path (e.g., first light path 103 illustrated in FIG. 1) at point 208. A characteristic of first light path (e.g., first light path 103 illustrated in FIG. 1) can be altered in response to first light path (e.g., first light path 103 illustrated in FIG. 1) striking the optical component 204 at point 208 to yield a second light path 202.

In some embodiments, the optical component 204 can be aligned in the pit 206 such that an orientation of second light path 202 can be directed along a particular axis or axes. As an example, the optical component can be a mirror, and the mirror can be aligned so as to alter a characteristic of a light beam (e.g., light path 103 illustrated in FIG. 1) incident thereto to direct the light beam along a particular path (e.g., light path 202).

FIG. 2B provides a top-view illustration of an optical component aligned with a first edge of a pit according to an embodiment of the present disclosure. In some embodiments, the pit 206 can be substantially rectangular. As illustrated in FIG. 2B, a first edge 210 of optical component 204 can be in substantial physical contact with a first edge 212 (e.g., an alignment edge) of the pit 206.

In some embodiments, as illustrated in FIG. 2B, the optical component 204 can be formed such that its shape is not substantially rectangular. In the illustration of FIG. 2B, the non-perpendicular edges (e.g., 210 and 211) of the optical component 204 are exaggerated to more clearly illustrate an optical component 204 having a shape that is not substantially rectangular. In such embodiments, losses and/or errors resulting from irregularities in the optical component can still be reduced and/or minimized by aligning an edge of the optical component 210 with an alignment edge of the pit 212. For example, second light path 202 can still be directed along a particular axis or axes at least in part because the optical component 204 can be aligned in the pit 206 when a first edge 210 of the optical component 204 is in substantial physical contact with a first edge 212 (e.g., an alignment edge) of the pit 206.

FIG. 2C provides a side-view illustration of an optical component aligned with a first edge 212 of a pit 206 according to an embodiment of the present disclosure. In the example illustrated in FIG. 2C, the pit 206 can include an under etch region 213. In some embodiments, the under etch region 213 can facilitate alignment of the optical component to an optical surface plane, for example in an optical system.

In some embodiments, the under etch region 213 can be formed on the surface of the substrate 220 by building up a multilayer structure (e.g., 221, 225) that can be patterned and then patterned and undercut to form an overhanging structure 225. Components of the multilayer structure (e.g., 221, 225) can be formed of different materials. For example, overhanging structure 225 can be formed from a metal, and layer structure 221 can be formed of silicon dioxide. In some embodiments, first edge 212 of the under etch region 213 can be an alignment edge.

In some embodiments, the under etch region 213 can be formed at a height above the surface of the substrate 220 so as to allow for the optical element 204 to be positioned such that a light path traveling away (e.g., light path 102 illustrated in FIG. 1) from the optical element 204 can be aligned with one or more components of an optical system, as discussed in more detail herein.

Figure 3:
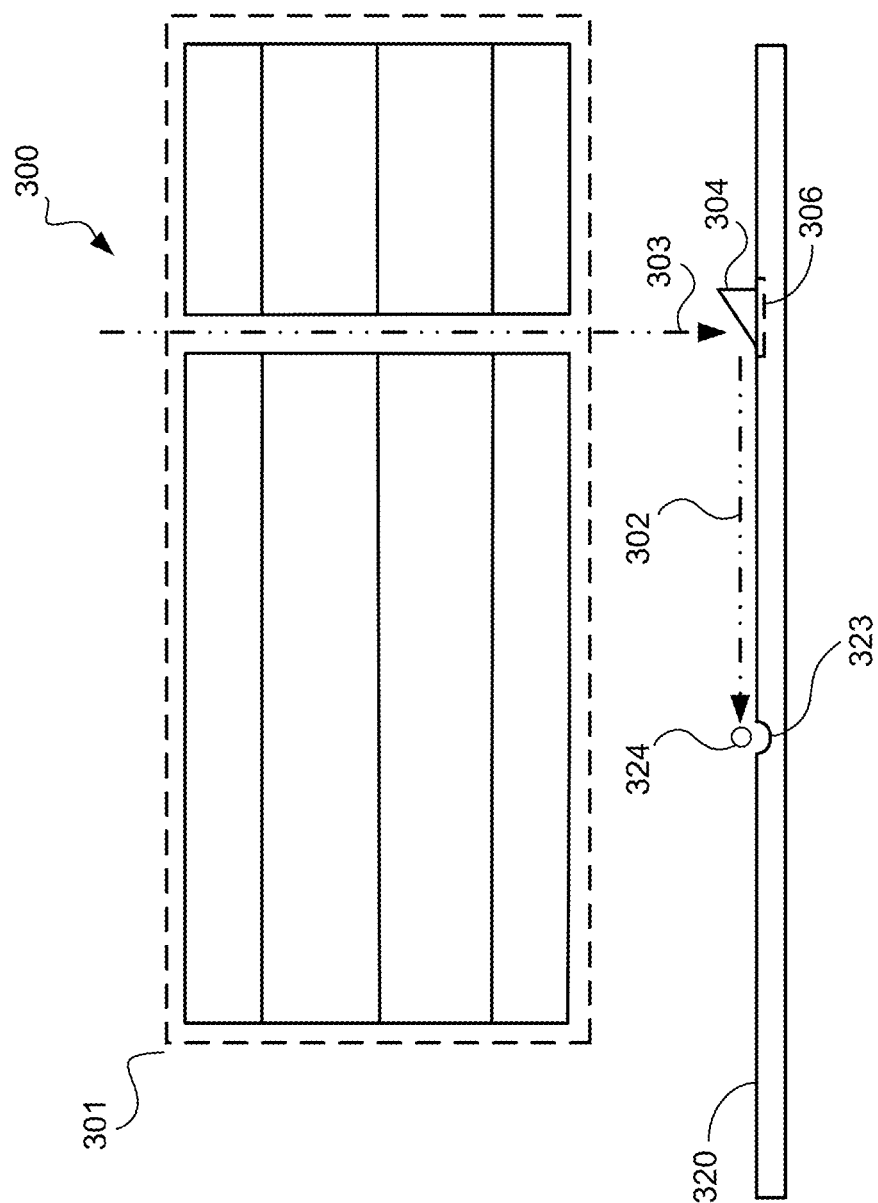
FIG. 3 provides an illustration of an optical component disposed in an optical system according to an embodiment of the present disclosure.
Figure 4:
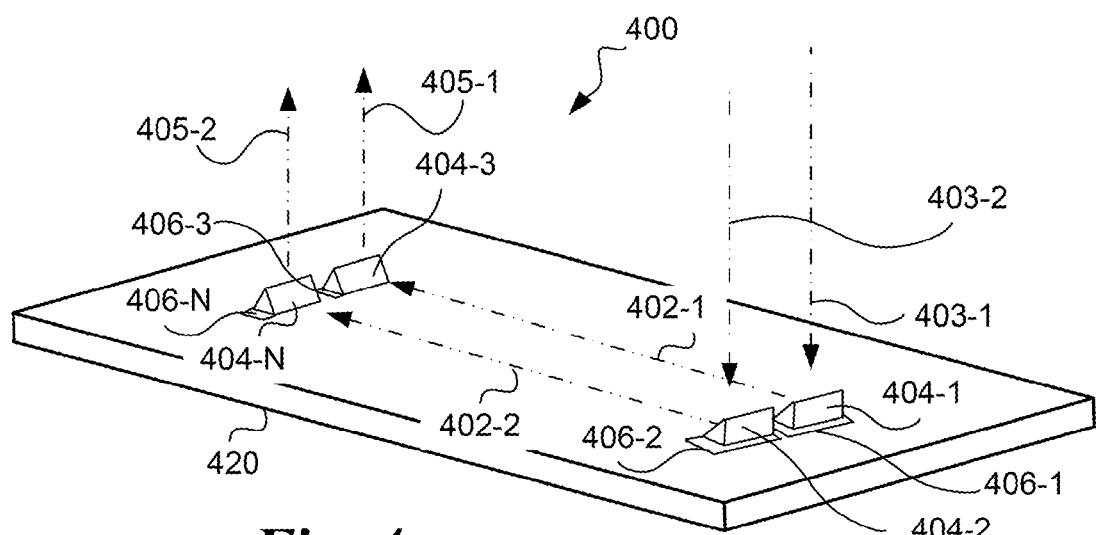
FIG. 4 provides an illustration of an example optical system including a plurality of pits and optical components according to an embodiment of the present disclosure.

In some embodiments, an optical component can be aligned within an optical system according to the present disclosure, as illustrated in FIGS. 3 and 4. Advantageously, alignment of an optical component within an optical system can help reduce and/or minimize errors and/or losses in the system, for example, by providing accurate alignment of a beam path with the optical component.

FIG. 3 provides an illustration of an optical component disposed in an optical system according to an embodiment of the present disclosure. In some embodiments, the apparatus 300 can include an apparatus body 301 and a substrate 320. A pit 306 can be disposed in the substrate 320 (e.g., a silicon substrate). In some embodiments, the pit can be formed such that an angle formed between the first alignment edge of the etch pit and the second alignment edge of the etch pit is 90 degrees. For example, the etch pit can be formed such that an angle between alignment edge 212 (illustrated in FIGS. 2A-2C) and alignment edge 214 (illustrated in FIGS. 2A-2C) of the etch pit is a 90 degree angle.

An optical component 304 can be disposed in the etch pit 306, and a first edge (e.g., edge 210 illustrated in FIGS. 2A-2C) of the optical component 304 can be in substantial physical contact with a first edge (e.g., edge 212 illustrated in FIGS. 2A-2C) of the etch pit 306. In some embodiments, the first edge of the optical component 304 can be parallel to an alignment edge of the etch pit 306. In some embodiments, the etch pit 306 can include an under etch region (e.g., under etch region 213 illustrated in FIG. 2C).

In some embodiments, a second edge (e.g., edge 211 illustrated in FIGS. 2A-2C) of the optical component 304 can be in substantial physical contact with a second edge (e.g., edge 214 illustrated in FIGS. 2A-2C) of the etch pit 306. In some embodiments, the second edge (e.g., edge 211 illustrated in FIGS. 2A-2C) of the optical component 304 can be parallel to the second edge (e.g., edge 214 illustrated in FIGS. 2A-2C) of the etch pit 306. In some embodiments, the second edge (e.g., edge 214 illustrated in FIGS. 2A-2C) of the etch pit 306 can be an alignment edge.

In some embodiments, substrate 320 and/or optical system 300 can include a trap 323 (e.g., an ion trap). In some embodiments, the optical component 304 can be aligned such that a first light beam 303 can strike the optical component 304 to yield light beam 302 exiting the optical component 304, which can be directed by the optical component 304 along a path incident to an ion 324 disposed in the ion trap 323.

FIG. 4 provides an illustration of an example optical system including a plurality of pits and optical components according to an embodiment of the present disclosure. The optical system embodiment 400 in FIG. 4 includes a plurality of pits 406-1, 406-2, 406-3, . . . , 406-N (referred to generally as pits 406, herein) and optical components 404-1, 404-2, 404-3, . . . , 404-N (referred to generally as optical components 404, herein) can be disposed on a substrate 420. In some embodiments, one or more of the plurality of pits 406-1, 406-2, 406-3, . . . , 406-N can include an under etch region (e.g., under etch region 213 illustrated in FIG. 2C).

In some embodiments, optical system 400 can be at least a part of an ion trap. In the example illustrated in FIG. 4, a first light path 403-1 can be directed at optical component 404-1. A characteristic of first light path 402-1 can be altered as a result of striking the optical component 404-1, and a second light path 402-1 can exit the optical component.

In various embodiments, another optical component, e.g., optical component 404-3 can be disposed in a respective pit 406-3 in the substrate 420. For example, optical component 404-3 can be aligned in the pit 406-3 such that the second light path 402-1 can strike optical component 404-3. In this regard, a characteristic of the second light path 402-1 can be altered to yield a third light path 405-1.

Similarly, a second set of optical components 404-2, 404-N can be disposed in respective pits 406-2, 406-N in the substrate 420. A first light path 403-2 can strike optical component 404-2 to yield a second light path 402-2. In some embodiments, the second light path 402-2 can strike optical component 404-N to yield a third light path 405-2. In such an embodiment, the light path 402-2 can be acted upon by 404-N to direct the third light path 405-2 out of the optical component or into a light containment area, thereby reducing the potential for light pollution within the component, among other benefits. This could also be the case with light path 405-1.

An example method 530 for alignment of an optical component according to one or more embodiments contained herein is presented below. In some embodiments, an etch pit and/or optical component can be formed using macromachining, micromachining, and/or etching techniques. For instance, anisotropic etching or deep reactive ion etching (DRIE) can be used to form portions of the pit and/or optical component. Anisotropic etching and DRIE are different etching techniques in the context of device fabrication.

Figure 5:
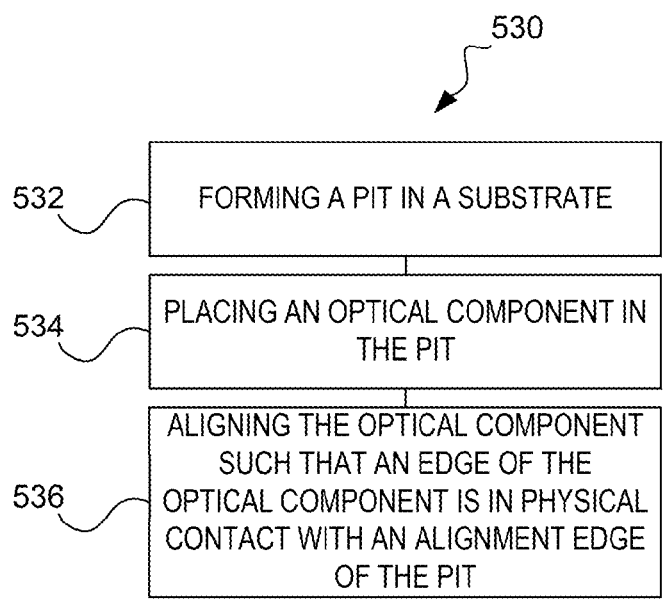
FIG. 5 provides an example flow chart of an example method for alignment of an optical component according to an embodiment of the present disclosure.

FIG. 5 provides an example flow chart of an example method for alignment of an optical component according to an embodiment of the present disclosure. At block 532, the method 530 can include forming a pit in a substrate. Embodiments are not so limited; however, and the pit can be formed on a substrate in some examples. As an example, the substrate can be a silicon substrate. In some embodiments, the method can include forming the pit such that the pit is substantially rectangular. In some embodiments, the method can include etching the pit in a substrate or forming the pit on the substrate.

At block 534, the method can include placing an optical component in the pit. As will be appreciated, the optical component can be formed using various micromachining and/or macromachining techniques. The optical component can be placed in the pit, or the optical component can be positioned in the pit. In some embodiments, the optical component can be a mirror, for example, a 45 degree corner type mirror.

At block 536, the method can include aligning the optical component such that an edge of the optical component is in physical contact with an alignment edge of the pit. In some embodiments, the optical component can be aligned in this fashion regardless of whether all the edges of the optical component are exactly perpendicular to one another.

In various embodiments, the method can include aligning the optical component in the pit such that the edge of the optical component is substantially parallel to the alignment edge of the pit. Some embodiments can include aligning the optical component such that a beam path exiting a surface of the optical component is directed along a particular path.

In some embodiments, the method can further include aligning the optical component in the pit such that a second edge of the optical component is in physical contact with a second alignment edge of the pit.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. In the foregoing Detailed Description, various features are grouped together in example embodiments illustrated in the figures for the purpose of streamlining the disclosure. Rather, inventive subject matter lies in less than all features of a single disclosed embodiment.

What is claimed:

1. A method for alignment of an optical component, comprising:
    forming a substrate with an ion trap and a pit formed therein;
    placing an optical component on a bottom surface of the pit such that a portion of the optical component extends underneath an under etch region of the pit; and
    aligning the optical component such that an edge of the optical component is in direct physical contact with the under etch region of the pit and such that a light beam exiting the optical component is directed along a path incident to an ion disposed in the ion trap.

2. The method of claim 1, comprising aligning the optical component in the pit such that the edge of the optical component is substantially parallel to an alignment edge of the pit.

3. The method of claim 1, comprising aligning the optical component such that a beam path exiting a surface of the optical component is directed along a particular path.

4. The method of claim 1, comprising forming the pit such that the pit is substantially rectangular.

5. The method of claim 1, wherein forming the pit comprises etching the pit in the substrate.

6. The method of claim 1, wherein the optical component is a mirror.

7. The method of claim 6, wherein the mirror is a 45 degree corner type mirror.

8. A system for alignment of an optical component, comprising:
a substrate having an ion trap thereon;
an etch pit having at least one alignment edge forming an edge of the pit; and
a mirror disposed on a bottom surface of the etch pit such that a portion of the mirror extends underneath an under etch region of the etch pit, wherein an edge of the mirror is in direct physical contact with an under edge region of the etch pit, and wherein the mirror is aligned such that a light beam exiting the mirror is directed along a path incident to an ion disposed in the ion trap.

9. The system of claim 8, wherein the edge of the mirror and the alignment edge of the etch pit are parallel to one another.

10. The system of claim 8, wherein the mirror is a 45 degree corner type mirror.

11. The system of claim 8, wherein the etch pit is formed in a silicon substrate.

12. The system of claim 8, wherein the mirror is aligned so as to alter a characteristic of a light beam incident thereto to direct the light beam along a particular path.

13. An apparatus for alignment of an optical component, comprising:
a substrate having a substrate surface and having an ion trap thereon;
an etch pit having a bottom surface lower than the substrate surface and side walls joining the bottom surface to the substrate surface; and
an optical component positioned on a bottom surface of the etch pit, wherein a first edge of the optical component is in substantial physical contact with a first sidewall of the etch pit in which the first sidewall provides a first alignment edge of the etch pit for alignment of the optical component, and wherein the optical component is aligned based on its contact with the first sidewall such that a light beam leaving the optical component is directed along a path incident to an ion disposed in the ion trap.

14. The apparatus of claim 13, wherein the first edge of the optical component is parallel to the first alignment edge of the etch pit.

15. The apparatus of claim 13, wherein the etch pit includes an under etch region.

16. The apparatus of claim 15, wherein the first alignment edge is an edge of the under etch region.

17. The apparatus of claim 15, wherein the alignment edge of the under etch region is substantially parallel to the first edge of the optical component.

18. The apparatus of claim 15, wherein the optical component is positioned on the bottom surface of the etch pit such that a portion of the optical component extends underneath the under etch region of the etch pit.

19. The apparatus of claim 15, wherein the optical component is in direct physical contact with the under etch region.

20. The apparatus of claim 13, wherein the optical component positioned on the bottom surface of the etch pit includes a second edge that is in substantial physical contact with a second sidewall of the etch pit in which the second sidewall provides a second alignment edge of the etch pit for alignment of the optical component, and wherein the optical component is aligned based on its contact with the first sidewall and second sidewall such that a light beam leaving the optical component is directed along a path incident to an ion disposed in the ion trap.

* * * * *